(12) United States Patent
Hirano et al.

(10) Patent No.: US 9,612,629 B2
(45) Date of Patent: Apr. 4, 2017

(54) SEALED STORAGE CANISTER

(71) Applicant: HGST Netherlands B.V., Amsterdam (NL)

(72) Inventors: Toshiki Hirano, San Jose, CA (US); Michael Stephen Bell, Colorado Springs, CO (US); Darya Amin-Shahidi, San Jose, CA (US); Vipin Ayanoor Vitikkate, Palakkad-Kerala (IN)

(73) Assignee: Western Digital Technologies, Inc., Irvine, CA (US)

( * ) Notice: Subject to any disclaimer, the term of this patent is extended or adjusted under 35 U.S.C. 154(b) by 291 days.

(21) Appl. No.: 14/297,611

(22) Filed: Jun. 5, 2014

(65) Prior Publication Data

US 2015/0355685 A1   Dec. 10, 2015

(51) Int. Cl.
  H05K 5/06     (2006.01)
  G06F 1/18     (2006.01)
  G11B 33/08    (2006.01)
  G11B 33/12    (2006.01)
  G11B 33/14    (2006.01)

(52) U.S. Cl.
  CPC ............. *G06F 1/181* (2013.01); *G06F 1/187* (2013.01); *G11B 33/08* (2013.01); *G11B 33/126* (2013.01); *G11B 33/128* (2013.01); *G11B 33/148* (2013.01)

(58) Field of Classification Search
  CPC ......... G06F 1/181; G06F 1/187; G11B 33/08; H05K 1/148
  USPC ....................... 361/679.34–679.39
  See application file for complete search history.

(56) References Cited

U.S. PATENT DOCUMENTS

| | | | |
|---|---|---|---|
| 5,392,192 A | 2/1995 | Dunn et al. | |
| 5,975,933 A | 11/1999 | Yamaguchi et al. | |
| 6,122,164 A | 9/2000 | Liao et al. | |
| 6,288,902 B1 | 9/2001 | Kim et al. | |
| 6,567,256 B1 * | 5/2003 | Schweitzer, III | H02H 7/261 361/16 |
| 6,683,745 B1 | 1/2004 | Sri-Jayantha et al. | |
| 7,042,736 B2 | 5/2006 | Katakura et al. | |
| 7,203,061 B1 * | 4/2007 | Chen | G11B 33/123 312/223.2 |
| 7,304,855 B1 * | 12/2007 | Milligan | G11B 33/128 361/724 |
| 7,353,435 B2 | 4/2008 | Matsushige et al. | |
| 7,911,788 B2 | 3/2011 | Sasagawa et al. | |
| 7,983,032 B2 | 7/2011 | Walker et al. | |

(Continued)

FOREIGN PATENT DOCUMENTS

WO   2007146294 A1   12/2007

*Primary Examiner* — Courtney Smith
*Assistant Examiner* — Christopher L Augustin

(57) ABSTRACT

A sealed storage canister is provided. The sealed storage canister in one example includes a sealed enclosure configured to be substantially hermetically sealed for retaining a predetermined gas or gas mixture, multiple unsealed Hard Disk Drives (HDDs) located within the sealed enclosure, with the multiple unsealed HDDs configured to allow the predetermined gas or gas mixture to move through the multiple unsealed HDDs, at least one mounting element configured to receive the multiple HDDs, and an external connector configured to be externally accessible, with the external connector being directly or indirectly electrically coupled to the multiple unsealed HDDs.

17 Claims, 14 Drawing Sheets

(56) References Cited

U.S. PATENT DOCUMENTS

| | | |
|---|---|---|
| 7,990,639 B2 | 8/2011 | Bisson et al. |
| 8,069,727 B2 | 12/2011 | Bougaev et al. |
| 8,199,425 B1 | 6/2012 | Gustafson et al. |
| 8,301,810 B2 | 10/2012 | Pang et al. |
| 8,976,530 B2 * | 3/2015 | Jeffery .................. G11B 33/02 361/679.33 |
| 2003/0147220 A1 * | 8/2003 | Fairchild ................. G06F 1/184 361/726 |
| 2003/0174464 A1 * | 9/2003 | Funawatari ............ G11B 33/08 361/679.36 |
| 2003/0210519 A1 * | 11/2003 | Wubs ..................... G11B 33/08 361/679.35 |
| 2004/0032710 A1 | 2/2004 | Fujiwara et al. |
| 2004/0159573 A1 | 8/2004 | Lim et al. |
| 2006/0048001 A1 | 3/2006 | Honda et al. |
| 2006/0061954 A1 * | 3/2006 | Lam ........................ G06F 1/187 361/679.35 |
| 2007/0053154 A1 * | 3/2007 | Fukuda ................ G11B 33/022 361/679.33 |
| 2008/0024899 A1 | 1/2008 | Chu et al. |
| 2010/0172083 A1 * | 7/2010 | Randall ................ G11B 33/126 361/679.31 |
| 2012/0175489 A1 * | 7/2012 | Taylor ................... F16F 15/067 248/563 |
| 2014/0092548 A1 * | 4/2014 | Lee ........................ G11B 33/08 361/679.34 |

* cited by examiner

SEALED STORAGE CANISTER

BACKGROUND OF THE INVENTION

Field of the Invention

Aspects of the disclosure are related to the field of data storage systems, and in particular, to a storage canister for use in a mass storage system.

Description of the Related Art

Mass storage systems are used for storing enormous quantities of digital data. As computer systems and networks grow in numbers and capability, there is a need for more and more storage system capacity. Cloud computing and large-scale data processing have further increase the need for digital data storage systems that are capable of transferring and holding immense amounts of data.

Mass storage systems are typically formed from a number of mass storage devices. The mass storage devices comprise very high capacity storage devices and may be themselves formed of multiple sub-units, sometimes referred to as sleds. A sled is a modular unit that can be added to or removed from a mass storage system. A mass storage system includes a rack or other receiving system that can receive a number of sleds. By forming a mass storage system using a number of sleds, any desired storage capacity can be attained.

A canister is a modular unit that can be added to or removed from a sled. A number of canisters can be held in a sled. Each canister can hold and operate one or more Hard Disk Drives (HDDs). The HDDs are held and operated in close proximity within a canister, so that as many HDDs as possible can be received in the defined volume of the canister. Consequently, the storage capacity of the sled can be increased in increments by the installation of an additional canister or canisters.

Efficiency is a prime consideration in a mass storage system. A small inefficiency in the HDDs used in a mass storage system can result in a significant increase in electrical power consumption for the mass storage system as a whole.

Another consideration is vibration. Each HDD used in the mass storage system may create vibrations during operation. Vibrations generated by one HDD can negatively affect other HDDs in the system. Further, where the mass storage rack and sub-structures create a rigid link between components or sub-components, then vibrations can be transmitted between the components or sub-components.

SUMMARY OF THE INVENTION

A sealed storage canister is provided. The sealed storage canister in one example includes a sealed enclosure configured to be substantially hermetically sealed for retaining a predetermined gas or gas mixture, multiple unsealed Hard Disk Drives (HDDs) located within the sealed enclosure, with the multiple unsealed HDDs configured to allow the predetermined gas or gas mixture to move through the multiple unsealed HDDs, at least one mounting element configured to receive the multiple HDDs, and an external connector configured to be externally accessible, with the external connector being directly or indirectly electrically coupled to the multiple unsealed HDDs.

DETAILED DESCRIPTION OF THE INVENTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

Figure 1:
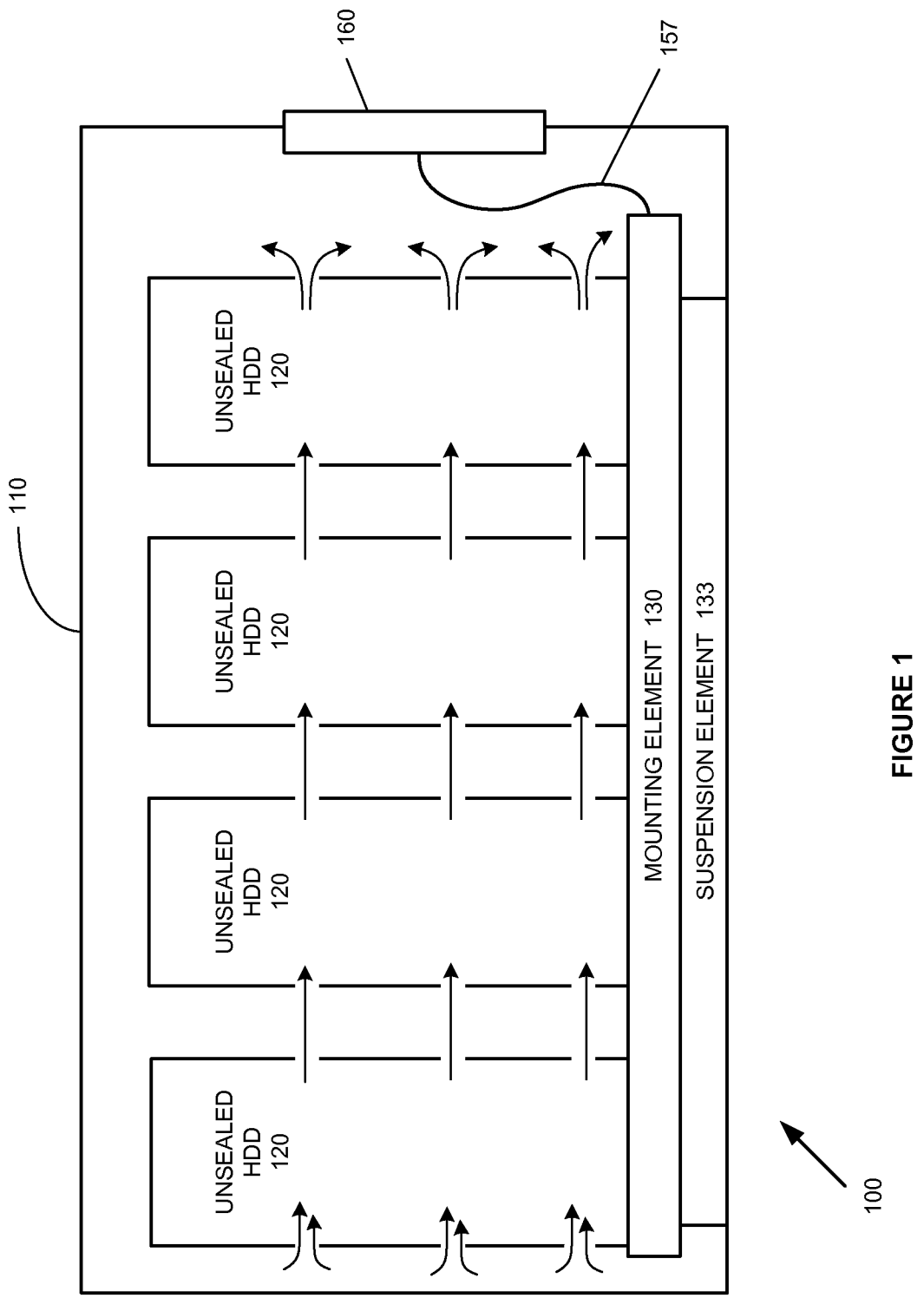
FIG. 1 shows an exemplary sealed storage canister in one example.

FIG. 1 shows an exemplary sealed storage canister 100 in one example. The sealed storage canister 100 includes a sealed enclosure 110, multiple unsealed Hard Disk Drives (HDDs) 120 located inside the sealed enclosure 110, at least one mounting element 130 receiving the multiple unsealed HDDs 120, an external connector 160 electrically coupled to the at least one mounting element 130 by a cable or feed-through 157, and a suspension element 133.

The sealed storage canister 100 can be used in a mass storage system, for example. The sealed storage canister 100 can include mounting features that enable the sealed storage canister 100 to be installed into and held in place in a rack, bay, or other receptacle of a mass storage system. The sealed storage canister 100 can be easily and efficiently added to, or removed from, a mass storage system. The sealed storage canister 100 can provide a large quantity of storage capacity to the mass storage system.

The multiple unsealed HDDs 120 comprise multiple digital storage devices, each including one or more rotating disks, with the disks comprising one or more of a magnetic medium, an optical medium, or other suitable disk storage medium for storing digital data. Therefore, in some examples, the multiple HDDs 220 comprise one or more disk storage media. In other examples, the multiple unsealed HDDs 120 comprise solid-state storage devices or comprise hybrid storage devices including one or more disk media and one or more solid-state storage components. However, the storage devices 120 or 220 will be referred to herein as unsealed HDDs 120 or HDDs 220 for simplicity. The unsealed HDDs 120 and HDDs 220 comprise non-volatile storage devices.

The multiple unsealed HDDs 120 are unsealed, wherein air or gas within the sealed enclosure 110 can enter and leave individual unsealed HDDs 120 (see arrows). By using unsealed HDDs 120 and a sealed enclosure 110, the sealed storage canister 100 can provide the advantages of individually sealed HDDs. The sealed storage canister 100 can provide the advantages of individually sealed HDDs, for a large number of HDDs. The sealed storage canister 100 can provide the advantages of individually sealed HDDs, but without the cost and drawbacks of using individually-sealed HDDs.

HDDs include a spinning disk that is typically rotated at a speed of thousands or tens of thousands of revolutions per minute (RPM). A read head is moved inward or outward from the center of the spinning disk in order to read and write data on the disk. These moving components can generate vibrations in the HDD. In addition, turbulence in the air or gas within the HDD due to the spinning disk can create vibrations in the outer portions of the disk. When a number of HDDs are included within a canister, which typically includes rigid structural members, the vibrations generated by one HDD can be transferred to other HDDs within the canister. The transferred vibrations can interfere with operations of the affected HDD or HDDs. The transferred vibrations can disrupt or block the read and write operations in an affected HDD. The transferred vibrations can combine with local vibrations already produced by the affected HDD to produce stronger and more disruptive vibrations than where the affected HDD is operating in isolation. The transferred vibrations can cause increase wear and breakage in components of the affected HDD.

Hermetically sealing a particular gas inside a HDD provides benefits. For example, corrosion resistance can be improved by preventing moisture from entering the HDD. Sealing helium (or other small-molecule gas) inside a HDD reduces air resistance, reduces air turbulence and therefore reduces flow-induced vibration of internal components, and as a result reduces power consumption of a drive motor that rotates the disk or disks of the HDD. However, using individually-sealed HDDs in a mass storage system adds cost and introduces risks associated with new product development.

Figure 4:
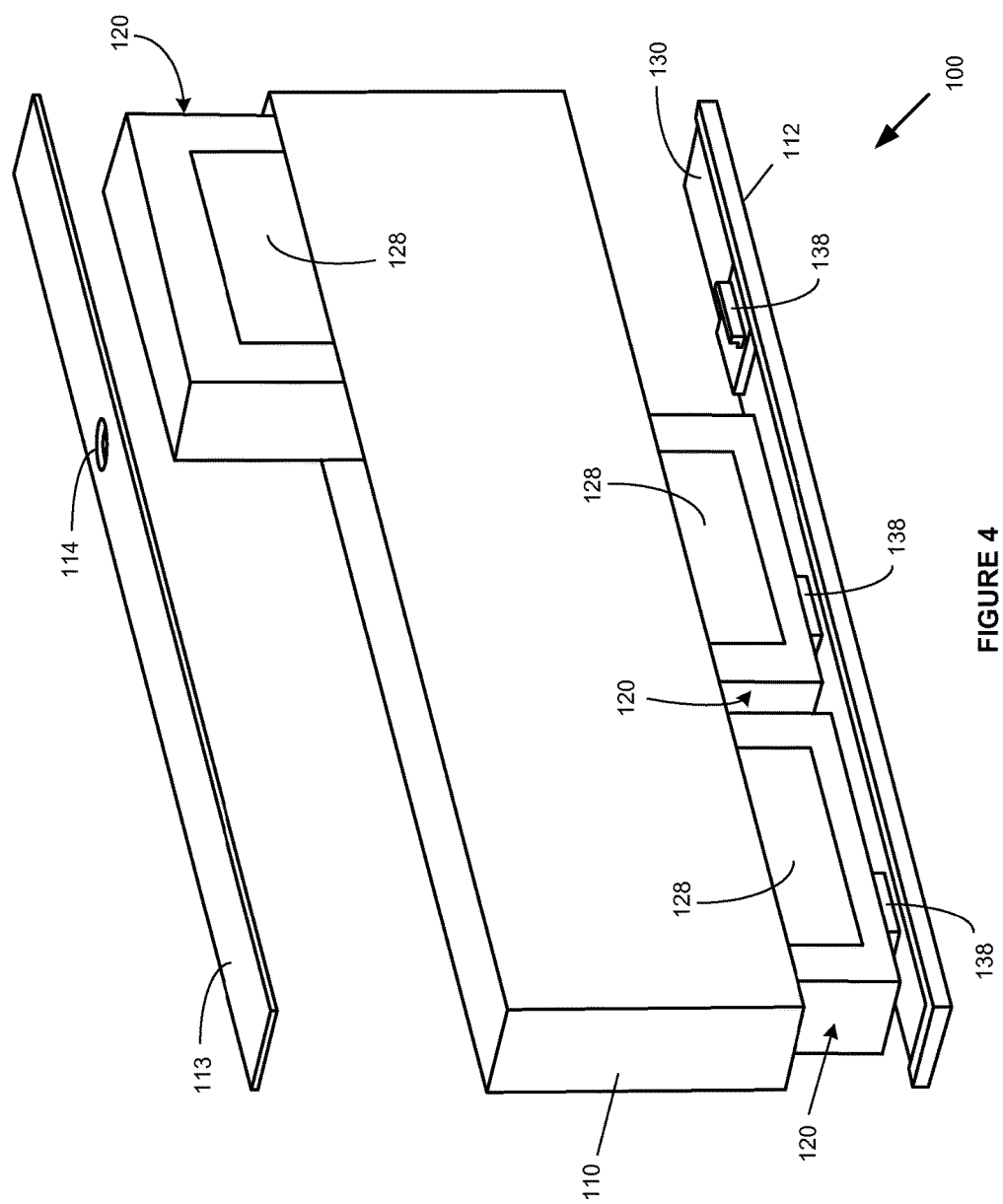
FIG. 4 shows the sealed storage canister in another example.
Figure 9:
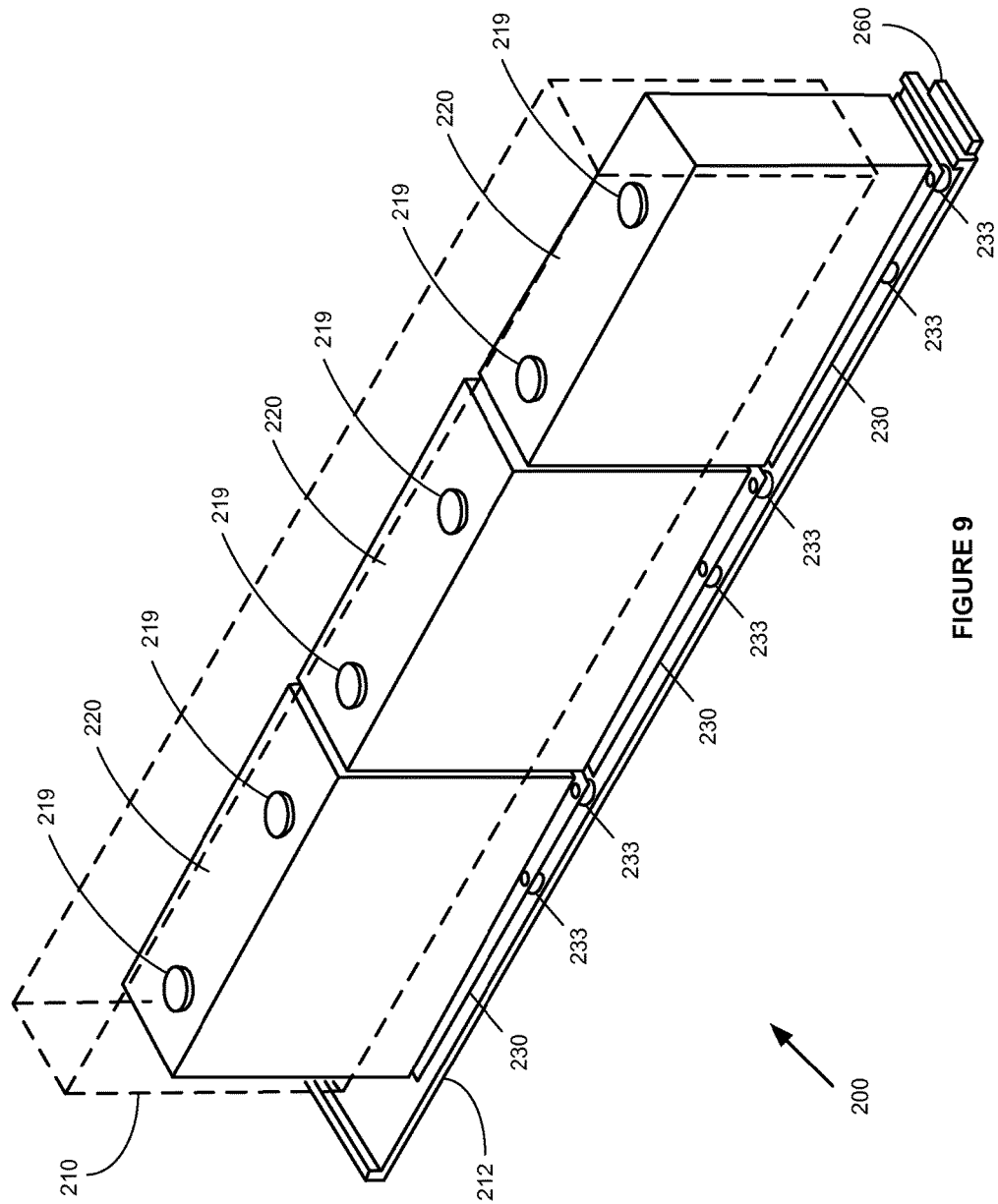
FIG. 9 shows a partially-assembled storage canister.
Figure 13:
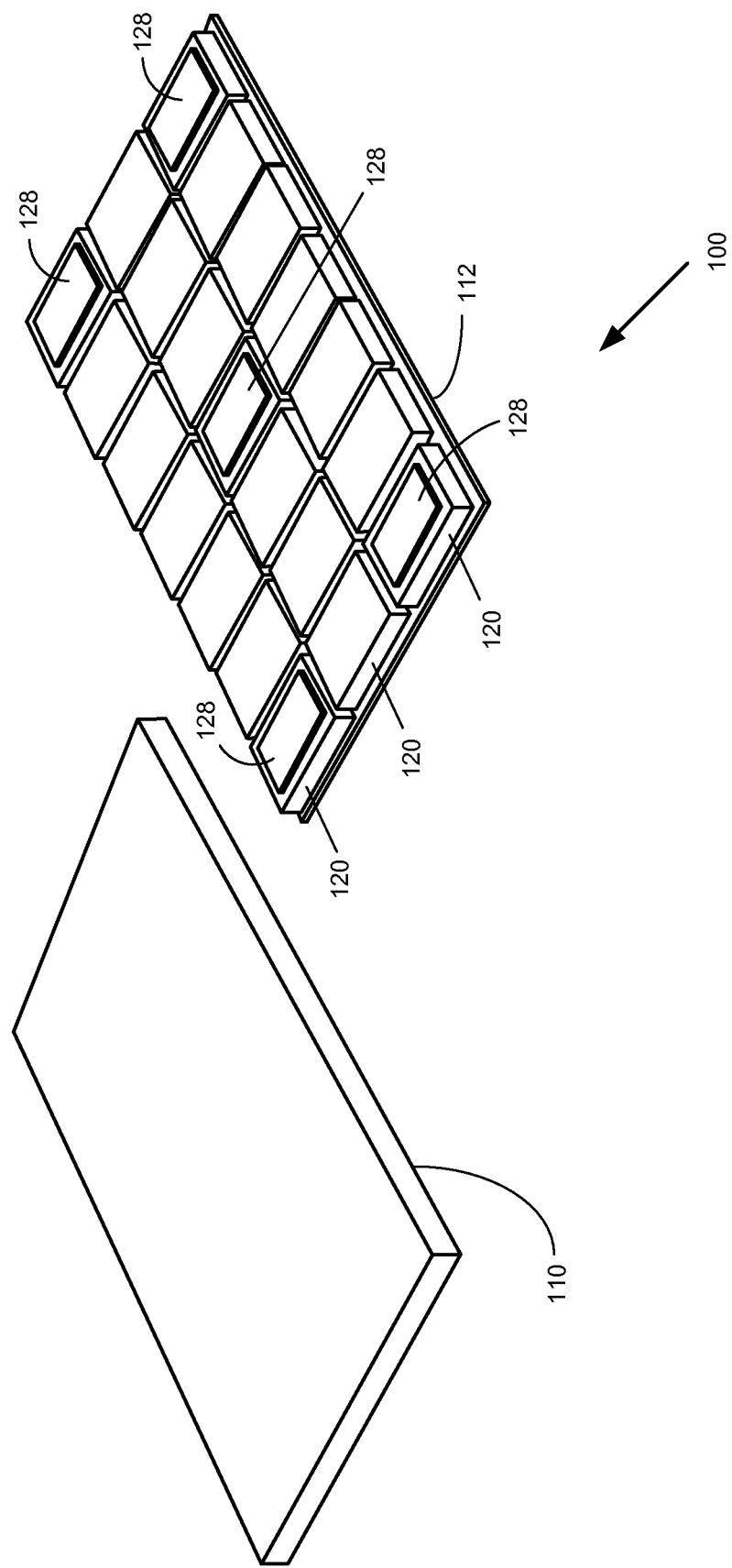
FIG. 13 shows the sealed storage canister in another example.

The sealed enclosure 110 in some examples comprises a shell 108 and a bottom panel 109 that is sealingly affixed to the shell 108 to form the sealed enclosure 110 (see FIGS. 4, 9, and 13). The sealed enclosure 110 comprises a substantially airtight or substantially gas tight enclosure. A predetermined gas or gas mixture is contained within the sealed enclosure 110. The predetermined gas or gas mixture sealed within the sealed enclosure 110 cannot escape and outside air cannot penetrate into the sealed enclosure 110. In some examples, the sealed enclosure 110 is coupled to a helium reserve (not shown) via a conduit. The helium reserve ensures that helium is maintained in the sealed enclosure 110 even where some leakage of helium from the sealed enclosure 110 occurs over time.

By placing the HDDs in the sealed enclosure 110, the individual HDDs can be hermetically sealed, but without the need for individually sealing each individual HDD. Sealing individual HDDs in a group within an external enclosure reduces the cost of the sealed storage canister 100. Also, by decoupling the seal design from a HDD design, it can provide an alternative with a lower development risk. Further, the use of a sealed enclosure reduces a rejection rate of HDDs, as the individual HDDs can be reclaimed if the sealed enclosure is defective, wherein a replacement sealed enclosure is simpler and cheaper to provide than replacing individual HDDs.

The predetermined gas or gas mixture sealed within the sealed enclosure 110 can reduce or eliminate moisture within the sealed enclosure 110, and therefore within the multiple unsealed HDDs 120. The predetermined gas or gas mixture reduces or eliminates corrosion and/or oxidization, including corrosion and/or oxidization of a disk or disks of the multiple unsealed HDDs 120. Where the predetermined gas or gas mixture sealed within the sealed enclosure 110 is at a reduced pressure, the predetermined gas or gas mixture can reduce rotational air resistance and air turbulence of a spinning disk or disks of the multiple unsealed HDDs 120. Where the predetermined gas or gas mixture comprises helium (or other gas or gas mixture having molecules smaller than air molecules), the gas can reduce rotational air resistance and turbulence of a spinning disk or disks of the multiple unsealed HDDs 120.

The predetermined gas or gas mixture sealed within the sealed enclosure 110 in some examples comprises dry air, nitrogen, or helium. However, the predetermined gas or gas mixture can comprise any suitable gas or gas mixture.

The predetermined gas or gas mixture sealed within the sealed enclosure 110 in some examples comprises gas at a pressure lower than atmospheric pressure. Alternatively, the predetermined gas or gas mixture comprises gas at an ambient pressure or higher than ambient pressure in other examples.

In some examples, the predetermined gas or gas mixture inside the sealed enclosure 110 can move by convection. Alternatively, or in addition, one or more fans can move and circulate the predetermined gas or gas mixture inside the sealed enclosure 110. In some examples, a heat pipe (not shown) can be included as part of the sealed enclosure 110. The heat pipe can include a heat exchanger in some examples. The heat pipe can include a heat exchanger and a cooling fluid. The heat pipe can include a heat exchanger, a cooling fluid, and a fluid pump.

The at least one mounting element 130 includes connectors for receiving the multiple unsealed HDDs 120 (see FIG. 4). The at least one mounting element 130 includes HDD connectors 138 for mechanically and electrically coupling the multiple unsealed HDDs 120 to the at least one mounting element 130, and holding the multiple unsealed HDDs 120 in position inside the sealed enclosure 110. The at least one mounting element 130 absorbs vibrations generated by the multiple unsealed HDDs 120. The at least one mounting element 130 includes the multiple HDD connectors 138 for providing electrical power to the multiple unsealed HDDs 120. The at least one mounting element 130 includes the multiple HDD connectors 138 for exchanging electrical signals with the multiple unsealed HDDs 120. The electrical signals can include digital data that is being written to and read from one or more HDDs of the multiple unsealed HDDs 120. Alternatively, the electrical connection and mechanical mounting functions are separately implemented. For example, a pair of soft and highly damped sheets or panels in some examples are used to sandwich the multiple unsealed HDDs 120 between the bottom panel 112 and the enclosure lid 113, wherein cables are used to make electrical connections between the multiple unsealed HDDs 120 and the external connector 160. It is also possible to use the same cables as a feed-through, where epoxy or other suitable potting material or filler material fills gaps between cables at the feed-through point.

In some examples, the at least one mounting element 130 comprises a single board element that receives all of the multiple unsealed HDDs 120. In other examples, the at least one mounting element 130 comprises multiple board elements, including individual board elements for each unsealed HDD 120 (see FIGS. 5 and 15, for example).

The external connector 160 is accessible at the exterior of the sealed enclosure 110. The external connector 160 does not allow air or gas to enter the sealed enclosure 110 or escape from the sealed enclosure 110. The external connector 160 receives electrical power from an external power source and provides electrical power to the at least one mounting element 130, and therefore to the multiple unsealed HDDs 120. The external connector 160 exchanges electrical signals with one or more external devices or components and exchanges electrical signals with the at least one mounting element 130, and therefore with the multiple unsealed HDDs 120.

Figure 7:
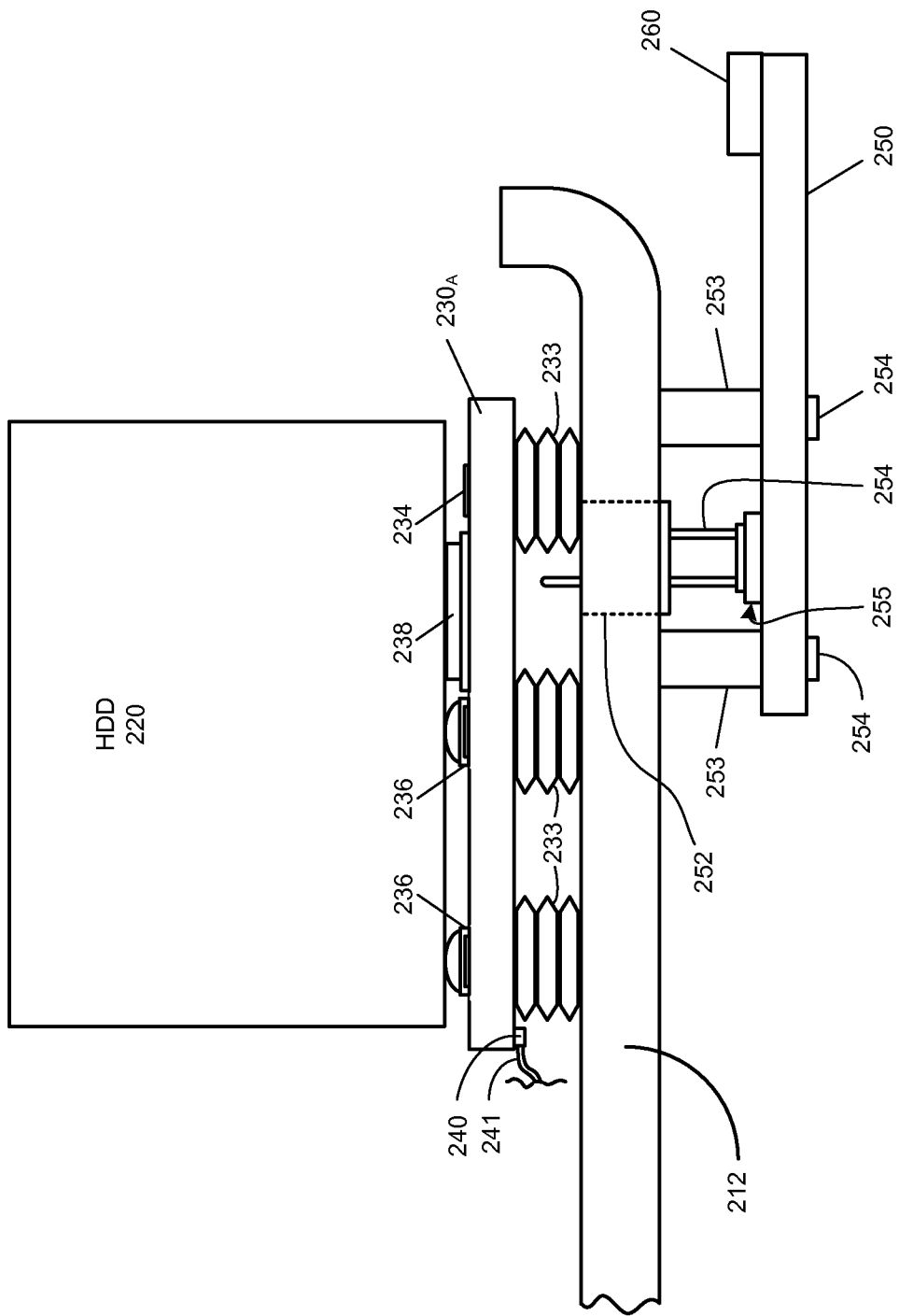
FIG. 7 shows a first mounting element coupled to an external connector.

The external connector 160 in some examples is electrically coupled to the at least one mounting element 130 via a cable 157 or a feed-through 255 (see FIG. 7). The feed-through 255 is sealingly installed in an aperture in the enclosure in some examples and passes a plurality of conductors 254 through a feed-through body 252. The feed-through body 252 sealingly engages an aperture in the sealed enclosure 110, such as an aperture in a bottom panel 112. Although the feed-through 255 is shown for the multiple mounting element example of FIG. 7, it should be understood that the feed-through 255 can be employed in any of the examples of the sealed enclosure 110, in addition to the examples of the enclosure 210. Although a single feed-through 255 is shown, it should be understood that multiple feed-throughs 255 can be employed, such as for noise reduction or for easier routing of signals.

The feed-through body 252 is formed of an electrically non-conductive material. The feed-through body 252 in some examples is formed of glass, plastic, ceramic, potting material, or any other suitable non-conductive material. Alternatively, or in addition, the feed-through 255 can transfer electrical signals through the sealed enclosure 110 using induction, electromagnetic waves, optical devices, or any other suitable signal transmission method or device.

The suspension element 133 in some examples is directly affixed to an inner surface or surfaces of the sealed enclosure 110, such as to a bottom panel 112. Alternatively, in other examples, the suspension element 133 includes one or more suspension components interposed between the mounting element 130 and an inner surface or surfaces of the sealed enclosure 110, wherein the one or more suspension components absorb shocks and vibrations. Alternatively, in yet another embodiment, each individual unsealed HDD 120 is received by a separate mounting element 130, with each separate mounting element 130 including a corresponding suspension element 133.

Individual unsealed HDDs 120 can be cooled by the predetermined gas or gas mixture circulating within the sealed enclosure 110. The circulating can occur due to convection. The circulating can occur due to a fan or other air-moving device being included within the sealed enclosure 110. In addition, where the sealed storage canister 100 is used within a mass storage sled, the sealed storage canister 100 can be cooled by air moving around the exterior of the sealed enclosure 110. Further, the exterior of the sealed enclosure 110 can include fins or other heat-exchange features in some examples for removing heat from the sealed storage canister 100.

Figure 2:
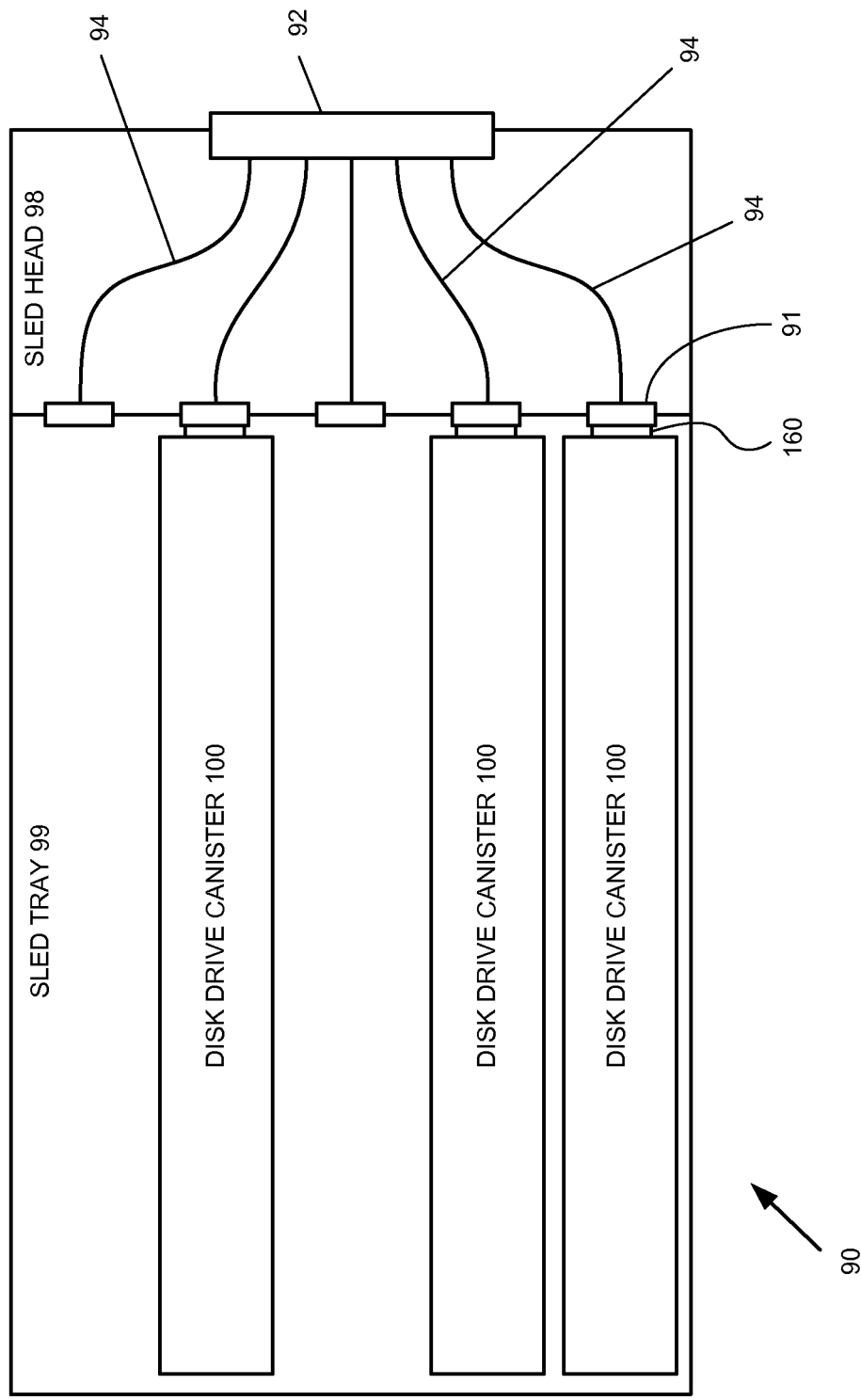
FIG. 2 shows multiple sealed storage canisters installed in an exemplary mass storage sled.

FIG. 2 shows multiple sealed storage canisters 100 installed in an exemplary mass storage sled 90. The mass storage sled 90 in the example includes a sled tray 99 configured to receive multiple sealed storage canisters 100. The external connector 160 of each installed sealed storage canister 100 couples to a corresponding canister connector 91. The canister connectors 91 are located in a sled head 98 affixed to the sled tray 99 in some examples. The sled head 98 further includes a sled external connector 92, wherein the multiple canister connectors 91 are all coupled to the sled external connector 92, such as by cables 94. It should be understood that the sled head 98 can include further components, such as a power distribution system, a signal interface or interfaces, and cooling equipment, for example.

Figure 3:
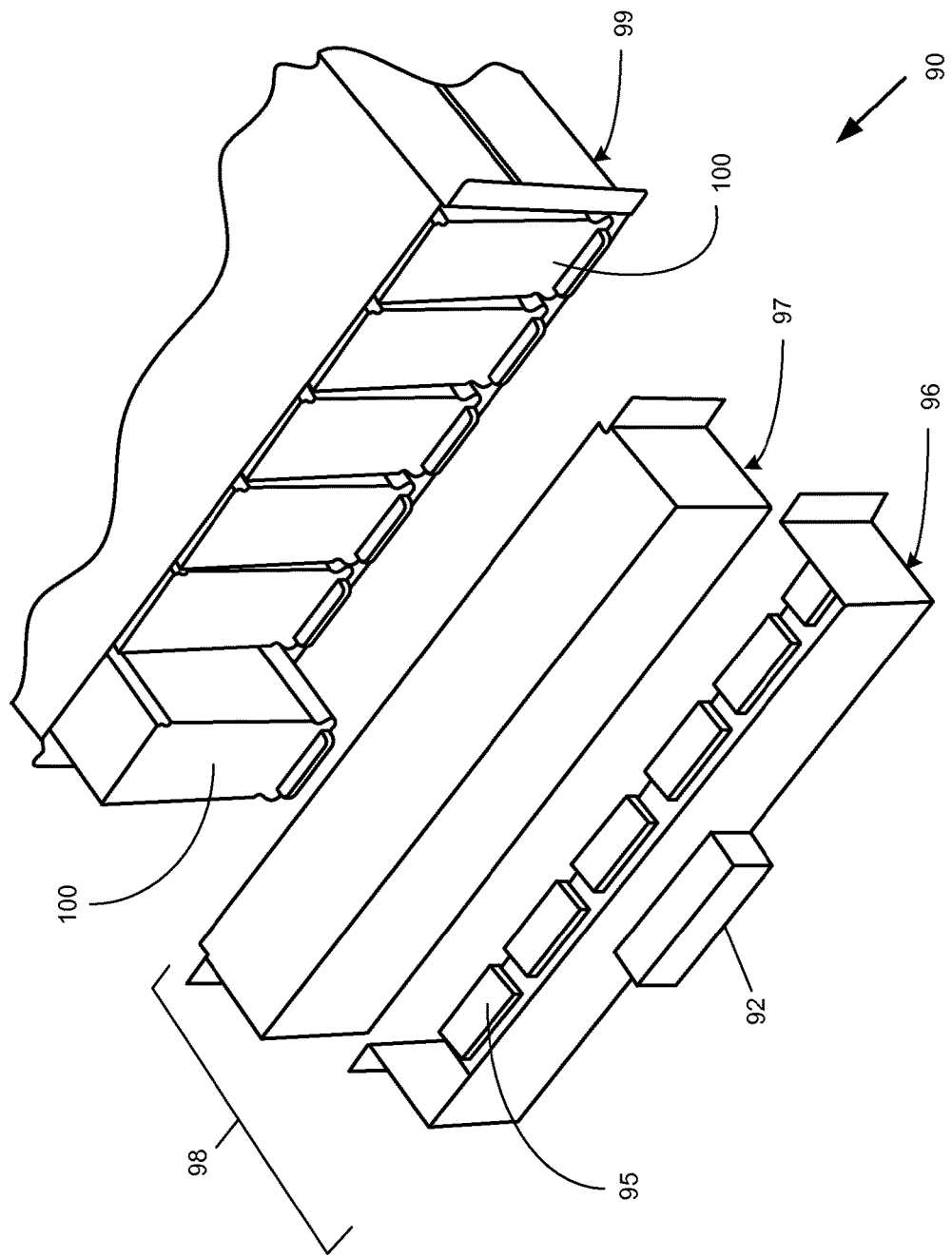
FIG. 3 shows detail of the mass storage sled.

FIG. 3 shows detail of the mass storage sled 90. In this example, the sled tray 99 has received a full complement of sealed storage canisters 100. The sled head 98 in this example comprises a sled interface 96 combined with a sled power supply module 97.

The sled interface 96 includes the sled external connector 92. The sled external connector 92 is coupled to multiple interface units 95, with an interface unit 95 included for each potential sealed storage canister. The multiple interface units 95 in some examples combine and separate electrical signals for individual storage canisters 100, wherein all electrical signals pass through the sled external connector 92 and wherein each sealed storage canister 100 receives only the appropriate electrical signals.

The sled power supply module 97 provides electrical power to the multiple sealed storage canisters 100. The sled power supply module 97 can provide power conditioning and/or power regulation for each sealed storage canister 100. In addition, in some examples, the sled power supply module 97 include s one or more fans or other cooling systems to cool the multiple sealed storage canisters 100. The sled power supply module 97 can sealingly fit to the sled tray 99 in some examples in order to complete the sealed enclosure 110.

FIG. 4 shows the sealed storage canister 100 in another example. In this example, the canister shell comprises the enclosure 110, an enclosure lid 113 configured to fit to a top opening of the enclosure 110, and a bottom panel 112 configured to fit to a bottom opening of the enclosure 110. The enclosure lid 113 includes a vent hole 114 in some examples. The mounting element 130 is mounted to and supported by the bottom panel 112. The mounting element 130 includes multiple HDD connectors 138 for receiving corresponding connectors of the multiple unsealed HDDs 120. A HDD connector 138 can snap, lock, press fit, friction fit, employ magnetic force, or employ any other suitable engagement features in order to hold the HDD 120 in place on the mounting element 130.

The combination of the enclosure 110, the enclosure lid 113, and the bottom panel 112 forms a sealed enclosure in some examples. The enclosure 110, the enclosure lid 113, and the bottom panel 112 can be sealingly joined, such as by welding, laser welding, soldering, brazing, adhesives, seals, or using other suitable sealing methods or sealing components. In addition, the vent hole 114 can be sealed after a predetermined gas or gas mixture has been provided inside the enclosure, at a desired pressure. The vent hole 114 can be sealed by a plug, patch, sealant, or other suitable sealing methods or sealing components. Alternatively, the enclosure structure can be sealed after assembly, such as by application of a film, paint, coating, shrink wrap, or other sealing material applied to the outside of the assembled enclosure. Alternatively, in yet another example, the enclosure lid 113 and the enclosure 110 comprise a single component.

Each unsealed HDD 120 in this example includes a contact layer 128 formed on portions of one or more sides of the unsealed HDDs 120. The contact layer 128 is configured to contact one or more corresponding inner surfaces of the sealed enclosure 110. In some examples, the contact layer 128 comprises an elastic layer configured to be at least partially compressed against the one or more inner surfaces of the sealed enclosure 110. The contact layer 128 cushions the unsealed HDDs 120 and absorbs shocks or vibrations. In other examples, the contact layer 128 comprises a thermally-conductive layer configured to conduct heat from the multiple unsealed HDDs 120 to the sealed enclosure 110. In yet other examples, the contact layer 128 is both elastic and thermally-conductive.

The assembly of the enclosure 110, the enclosure lid 113, and the bottom panel 112 may require a nominal compression force. As a result, the unsealed HDDs 120 will not remain loose or able to move inside the sealed enclosure 110 when the enclosure lid 113 and the bottom panel 112 are fully assembled to the enclosure 110.

Figure 5:
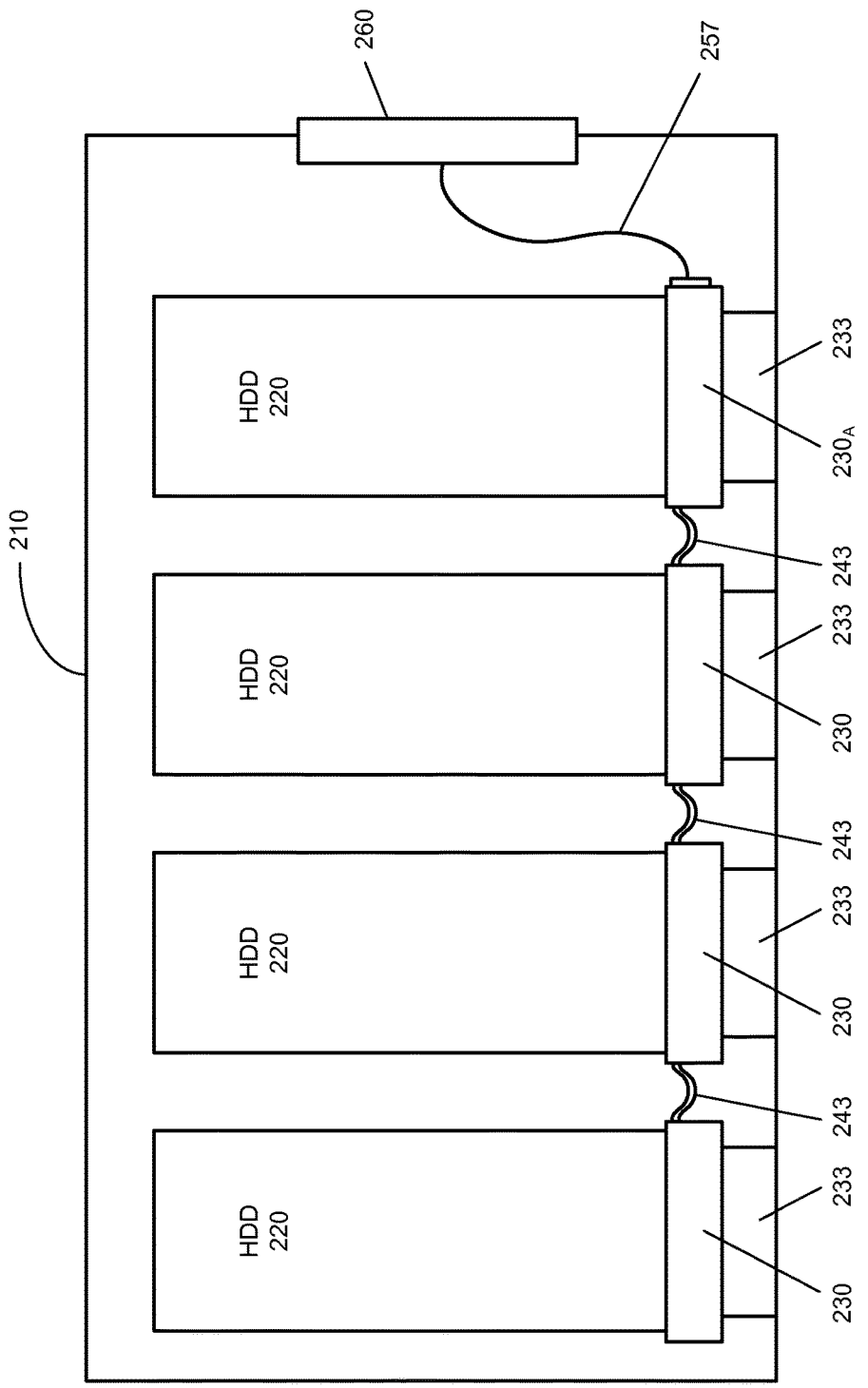
FIG. 5 shows an exemplary storage canister in another example.

FIG. 5 shows an exemplary storage canister 200 in another example. The storage canister 200 includes an enclosure 210, multiple Hard Disk Drives (HDDs) 220 located inside the enclosure 210, multiple mounting elements 230 receiving the multiple HDDs 220, an external connector 260 electrically coupled to the multiple mounting elements 230 by cabling or a feed-through 255, multiple compressible support spacers 233 coupled to the multiple mounting elements 230, and flexible connector elements 243 extending between adjacent mounting elements 230.

The multiple HDDs 220 comprise digital storage devices, as previously discussed. The multiple HDDs 220 in this example comprise sealed or unsealed HDDs. In some examples, the multiple HDDs 220 comprise one or more disk storage media. In other examples, the multiple HDDs 220 comprise solid-state storage devices or comprise hybrid storage devices including one or more disk media and one or more solid-state storage components. However, the storage devices 120 or 220 will be referred to herein as unsealed HDDs 120 or HDDs 220 for simplicity. The unsealed HDDs 120 and HDDs 220 comprise non-volatile storage devices.

The enclosure 210 in some examples comprises a non-sealed or non-airtight enclosure. Alternatively, in other examples the enclosure 210 comprises a substantially airtight or substantially gas tight enclosure, as previously discussed.

The mounting elements 230 comprise substantially planar elements that are rigid or at least partially rigid. The multiple mounting elements 230 absorb vibrations generated by each corresponding HDD 220.

Figure 6:
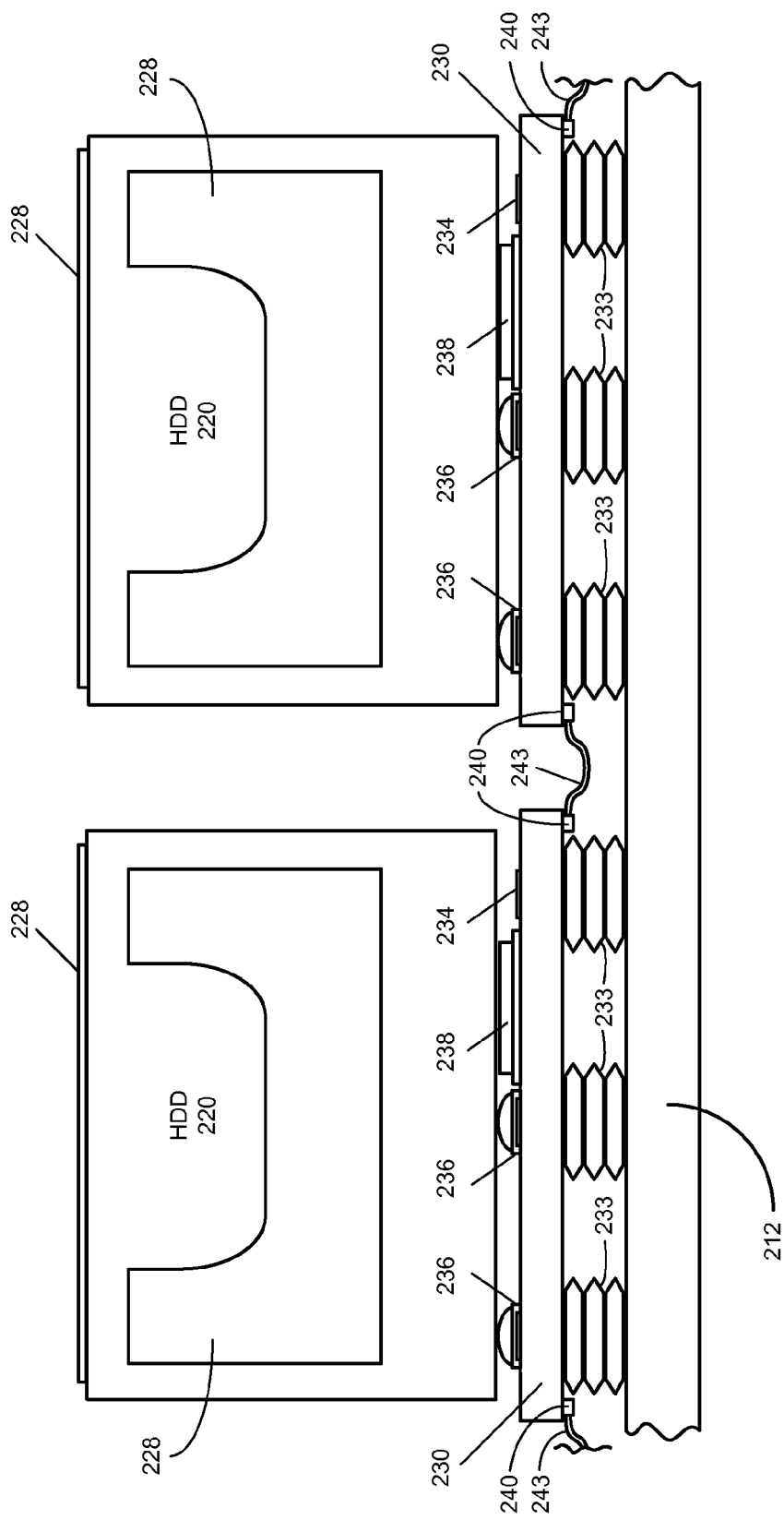
FIG. 6 shows detail of the multiple mounting elements of FIG. 5.

The multiple mounting elements 230 each include a HDD connector 238 for receiving the multiple HDDs 220 (see FIGS. 4 and 6, for example). The HDD connectors 238 mechanically and electrically couple the multiple HDDs 220 to the multiple mounting elements 230 and hold the multiple HDDs 220 in position. The HDD connectors 238 provide electrical power to the multiple HDDs 220. The HDD connectors 238 exchange electrical signals with the multiple HDDs 220. The electrical signals can include digital data that is being written to and read from one or more HDDs of the multiple HDDs 220.

The multiple compressible support spacers 233 in this example are affixed to an inner surface or surfaces of the enclosure 210, such as a bottom panel 212. Each mounting element 230 includes a corresponding compressible support spacer 233. The multiple compressible support spacers 233 are interposed between the multiple mounting elements 230 and an inner surface or surfaces of the enclosure 210. The multiple compressible support spacers 233 absorb shocks and vibrations of the individual HDDs 220.

A compressible support spacer 233 can be formed in a shape suitable for absorbing shocks or vibrations in one or more axes of motion. A compressible support spacer 233 in some examples has a bellows or accordion-like shape to allow vertical compression and expansion (see FIGS. 6 and 7). In other examples, a compressible support spacer 233 has a toroidal or doughnut-like shape, allowing some horizontal movement of the mounting element 230, in addition to vertical compression and expansion (see FIGS. 9-12 and 14). However, it should be understood that a compressible support spacer 233 can be formed in other suitable shapes, and the examples given herein are for illustration only and are not limiting.

The multiple mounting elements 230 and the multiple compressible support spacers 233 absorb shocks and vibrations generated by the individual HDDs 220. The multiple mounting elements 230 and multiple compressible support spacers 233 do not transfer shocks or vibrations from an individual HDD 220 to the storage canister 200. The multiple mounting elements 230 and the multiple compressible support spacers 233 do not transfer shocks or vibrations to an HDD 220 from sources outside the HDD 220, such as from other HDDs or from the storage canister 200, for example.

Flexible connector elements 243 extend between adjacent mounting elements 230. Each flexible connector element 243 is flexible or at least partially flexible, such as a flexible cable, flexible circuit board, or other suitable connector element. The flexible connector elements 243 include a plurality of flexible conductors for conducting electrical power and electrical signals between the adjacent mounting elements 230. Consequently, due to the chaining of the mounting elements 230, electrical power is provided from the external connector 260 to each HDD of the multiple HDDs 220. Further, electrical signals are exchanged between the external connector 260 and each HDD of the multiple HDDs 220. The flexible connector elements 243 ensure that any vibrations or movements in a particular HDD are not transmitted to other HDDs or other components of the storage canister 200. Further, the flexible connector elements 243 can include slack material, wherein the flexible connector elements 243 do not have tension forces acting on them and therefore do not transfer impacts or vibrations between the mounting elements 230.

The external connector 260 is accessible at the exterior of the enclosure 210. The external connector 260 in some examples does not allow air or gas to enter the enclosure 210 or escape from the enclosure 210, while in other examples the enclosure 210 is not substantially air or gas tight. The external connector 260 receives electrical power from an external power source and provides electrical power to multiple mounting elements 230, and therefore to the multiple HDDs 220. The external connector 260 exchanges electrical signals with one or more external devices or components and exchanges electrical signals with the multiple mounting elements 230, and therefore with the multiple HDDs 220.

FIG. 6 shows detail of the multiple mounting elements 230 of FIG. 5. A bottom panel 212 is located below and supports the multiple mounting elements 230. The bottom panel 212 is mounted to and completes the enclosure 210 (see FIGS. 4, 9, and 13, for example). Each mounting element 230 includes a plurality of compressible support spacers 233, a corresponding plurality of spacer retainers 234, an HDD connector 238, and two or more bumpers 236.

The plurality of compressible support spacers 233 are positioned between the bottom panel 212 and the mounting element 230, wherein the mounting element 230 rests on the tops of the plurality of compressible support spacers 233. However, it should be understood that the mounting element 230 is free to move vertically, and can move upwards and downwards with respect to the plurality of compressible support spacers 233.

The plurality of spacer retainers 234 extend through the mounting element 230 to retain the plurality of compressible support spacers 233 in position. The plurality of spacer retainers 234 in some examples are permanently or removably affixed to the bottom panel 212. In contrast, the plurality of spacer retainers 234 are not directly affixed to the mounting element 230, wherein the mounting element 230 can move vertically, in a limited fashion, with respect to the bottom panel 212. In some examples, the plurality of spacer retainers 234 can have a flange or head that allows the mounting element 230 to move upward by a predetermined amount, but cannot move off of the plurality of spacer retainers 234.

A HDD 220 has been inserted down onto a mounting element 230, wherein a corresponding connector portion of the HDD 220 engages the HDD connector 238 of the mounting element 230. The HDD 220 is supported in position by the two or more bumpers 236 affixed to, and projecting up from, the mounting element 230. The HDD connector 238 provides electrical power to the HDD 220 when the HDD 220 is fully installed to the mounting element 230. The HDD connector 238 exchanges electrical signals with the HDD 220. In some examples, the HDD connector 238 includes latches, coupler portions, or other attachment features that hold the HDD 220 to the mounting element 230. A HDD connector 238 can snap, lock, press fit, friction fit, employ magnetic force, or employ any other suitable engagement features in order to hold the HDD 220 in place on the mounting element 230.

Each mounting element 230 is supported on the bottom panel 212 by the plurality of compressible support spacers 233. The plurality of compressible support spacers 233 are formed of an at least partially compressible or deformable material, such as rubber or rubber-based compounds, for example. The plurality of compressible support spacers 233 absorb shocks, such as shocks imparted to the mounting element 230 during installation or servicing of the HDD 220. Further, the plurality of compressible support spacers 233 absorb vibrations generated by the HDD 220. As a result, HDD shocks or vibrations are not transmitted into the bottom panel 212 (or to other HDDs). The plurality of compressible support spacers 233 absorb vibrations, such as vibrations generated by the HDD 220. In addition, the plurality of compressible support spacers 233 absorb the shocks or vibrations that may be present in the bottom panel 212. As a result, such support pan shocks and vibrations are not transmitted into the multiple HDDs 220.

Each mounting element 230 includes one or two chaining connectors 240 for chaining together the multiple mounting elements 230. A flexible connector element 243 extends between two adjacent chaining connectors 240 of two adjacent mounting elements 230. The flexible connector element 243 includes a plurality of conductors for conducting electrical power and electrical signals between the two adjacent mounting elements 230. Consequently, due to the chaining of the mounting elements 230, electrical power is provided from the external connector 260 to each HDD of the multiple HDDs 220. Further, electrical signals are exchanged between the external connector 260 and each HDD of the multiple HDDs 220.

Each HDD 220 in this example includes a contact layer 228 formed on portions of one or more sides of the HDDs 220. The contact layer 228 is configured to contact one or more corresponding inner surfaces of the enclosure 210. In some examples, the contact layer 228 comprises an elastic layer configured to be at least partially compressed against the one or more inner surfaces of the enclosure 210. The contact layer 228 cushions the HDDs 220 and absorbs shocks or vibrations. In other examples, the contact layer 228 comprises a thermally-conductive layer configured to conduct heat from the multiple HDDs 220 to the enclosure 210. In yet other examples, the contact layer 228 is both elastic and thermally-conductive.

FIG. 7 shows a first mounting element $230_A$ coupled to the external connector 260. The figure shows the bottom panel 212 located under the multiple HDDs 220 and multiple mounting elements 230. The bottom panel 212 is affixed to the enclosure 210. The first mounting element $230_A$ is supported on the bottom panel 212 by the plurality of compressible support spacers 233, as previously discussed.

A connector board 250 is affixed to the bottom panel 212. The external connector 260 is affixed to the connector board 250. At least two spacers 253 are positioned between the connector board 250 and the bottom panel 212. The at least two spacers 253 are held in position by at least two corresponding spacer retainers 254. In addition, the at least two spacer retainers 254 permanently or removably affix the connector board 250 to the bottom panel 212. Alternatively, the at least two spacers 253 comprise a single annular spacer 253 positioned between the bottom panel 212 and the connector boards 250. A feed-through 255 is located in the bottom panel 212 of the enclosure 210. The feed-through 255 is electrically coupled to the connector board 250. The feed-through 255 conducts electrical power and electrical signals through the enclosure 210, while not allowing air or gas to pass into or out of the enclosure 210. The feed-through 255 includes a plurality of conductors 254 that pass through a feed-through body 252. Where the enclosure 210 comprises a sealed enclosure, the feed-through body 252 seals around the plurality of conductors 254 and sealingly engages and is affixed within an aperture in the bottom panel 212.

The feed-through body 252 is formed of an electrically non-conductive material. The feed-through body 252 in some examples is formed of glass, plastic, ceramic, potting material, or any other suitable non-conductive material. Alternatively, or in addition, the feed-through 255 can transfer electrical signals through the enclosure 210 using induction, electromagnetic waves, optical devices, or any other suitable signal transmission method or device.

The feed-through 255 can be used in a non-sealed (or not fully sealed) enclosure 210, as shown. Alternatively, or in addition, the feed-through 255 can be incorporated into the sealed enclosure 110.

Figure 8:
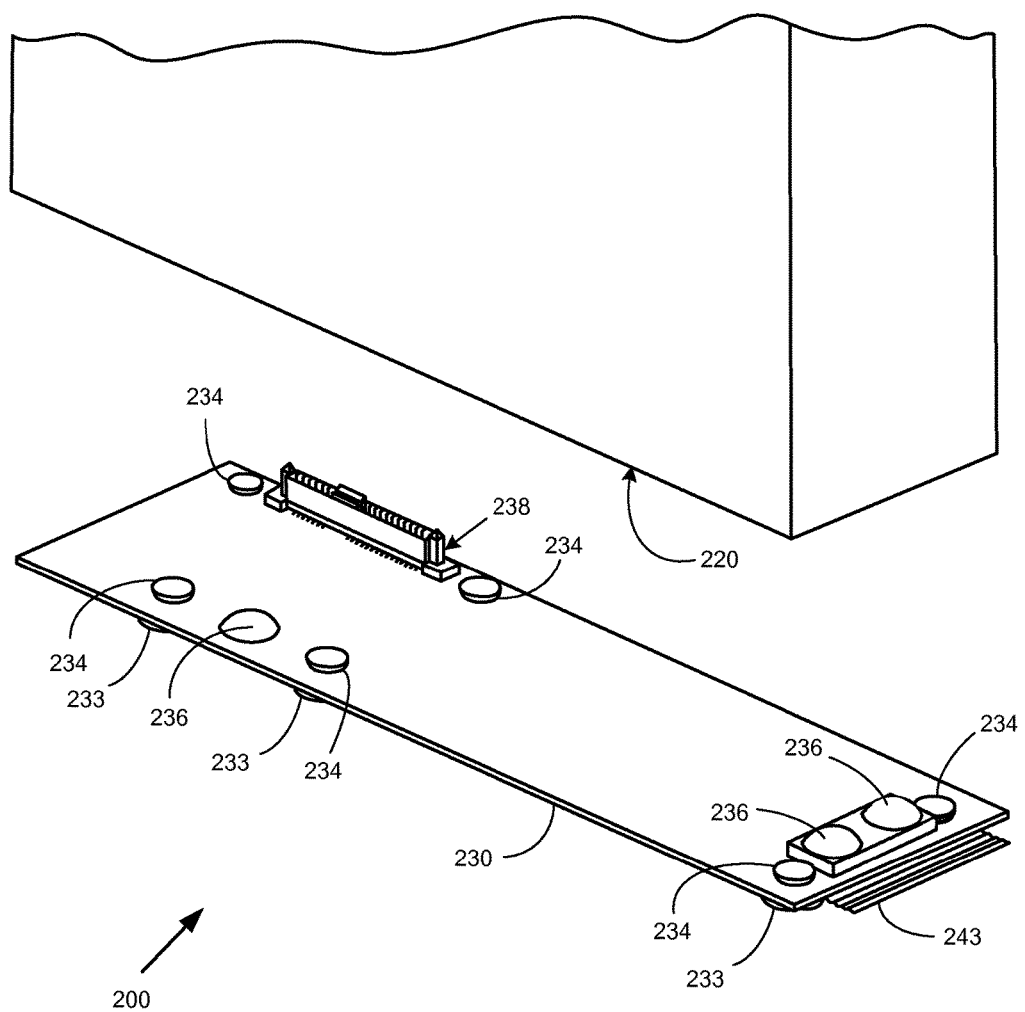
FIG. 8 shows a mounting element receiving a HDD.

FIG. 8 shows a mounting element 230 receiving a HDD 220. An HDD connector 238 is affixed to the mounting element 230 and is configured to couple to a corresponding connector portion of the HDD 220. Conductor elements of the HDD connector 238 are coupled to traces or other conductor elements of the mounting element 230. The HDD connector 238 can include insertion features that force a predetermined orientation of the HDD 220 and can include one or more retaining features that engage a HDD 220 when inserted.

The mounting element 230 in the example includes one or more bumpers 236 affixed to an upper side of the mounting element 230 and projecting upwards from the mounting element 230. The one or more bumpers 236 in some examples are formed of an at least partially elastomeric material. Alternatively, in other examples the one or more bumpers 236 are formed of a partially elastomeric or substantially non-elastomeric material. The one or more bumpers 236 can be formed on the mounting element 230, or can be permanently or removably affixed to the mounting element 230. An inserted HDD 220 can rest on the one or more bumpers 236 or can limit and absorb downward movement of the HDD 220. Further, the one or more bumpers 236 absorb shocks and vibrations. Consequently, shocks and vibrations are not transferred between the mounting element 230 and the HDD 220.

The mounting element 230 in the example includes one or more compressible support spacers 233 affixed to a lower side of the mounting element 230. The compressible support spacers 233 in the example are affixed to the mounting element 230 by one or more corresponding spacer retainers 234. The spacer retainers 234 pass through the mounting element 230 and retain the compressible support spacers 233 to the mounting element 230. The spacer retainers 234 include heads that allow the mounting element 230 to move downward with respect to the spacer retainers 234, such as due to a shock or vibration, but limit the upward travel of the mounting element 230. Alternatively, in some examples the spacer retainers 234 limit the motion of the mounting elements 230 in both directions, up and down, allowing only a limited amount of vertical movement of the mounting element 230. However, given the design of the compressible support spacers 233, the added constraint is substantially soft.

A flexible connector element 243 is shown coupled to the mounting element 230. The flexible connector element 243 can be directly affixed to traces, pads, or other conductors of the mounting element 230, such as by soldering. Alternatively, in other examples the flexible connector element 243 can be received in a chaining connector 240 that is affixed to the mounting element 230 and that is electrically coupled to traces, pads, or conductor elements of the mounting element 230. The flexible connector element 243 therefore can provide electrical power to and exchange electrical signals with the HDD 220. Further, the mounting element 230 can be chained to other such mounting elements, wherein the flexible connector element 243 provides electrical power and electrical signals to more than just one mounting element.

FIG. 9 shows a partially-assembled storage canister 200. In this example, three mounting elements 230 have been positioned on the bottom panel 212. The mounting elements 230 rest on compressible support spacers 233. Three HDDs 220 are installed on the three mounting elements 230. The flexible connector elements 243 (not shown in this figure) can couple the mounting elements 230 in a chain. It can be seen that each mounting element 230 is independent and is independently cushioned from shocks and vibration. The enclosure 210 can then be fitted to the bottom panel 212. The assembled enclosure 210 and bottom panel 212 can be permanently or removably affixed to each other. The enclosure 210 can be sealingly affixed to the bottom panel 212 in some examples to create the sealed storage canister 200, such as by welding, laser welding, soldering, brazing, adhesives, seals, or using other suitable sealing methods or sealing components. Alternatively, as previously discussed, the enclosure structure can be sealed after assembly, such as by application of a film, paint, coating, shrink wrap, or other sealing material applied to the outside of the assembled enclosure.

The assembly of the enclosure 210 and the bottom panel 212 may require a nominal compression force. As a result, the HDDs 220 will not remain loose or able to move inside the enclosure 210 when the bottom panel 212 is fully assembled to the enclosure 210.

Figure 10:
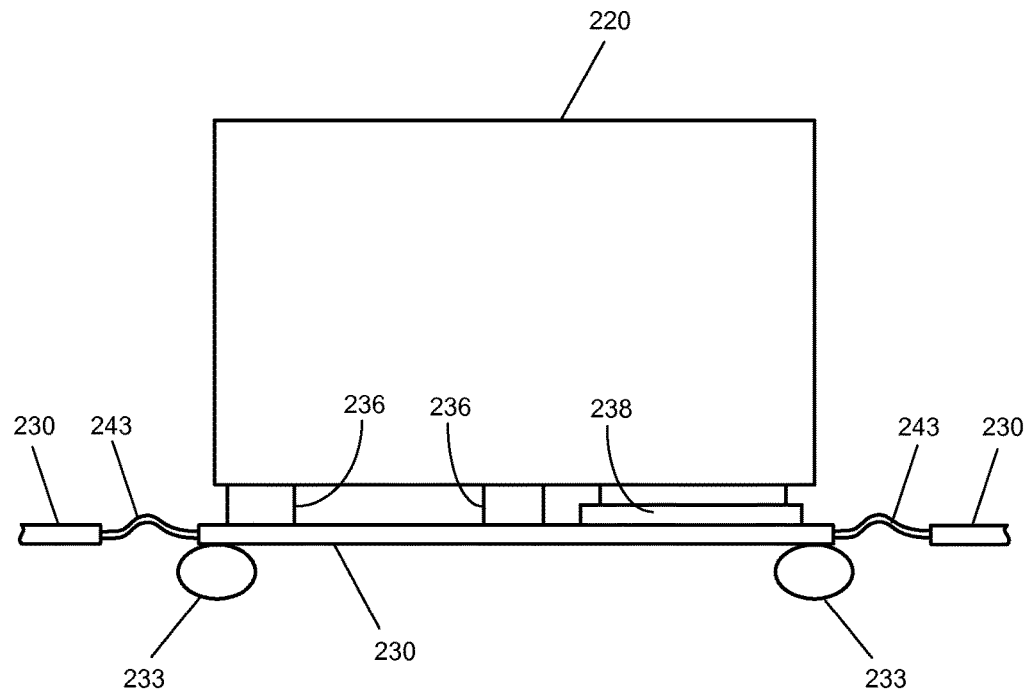
FIG. 10 shows a HDD installed on its side on a mounting element.

FIG. 10 shows a HDD 220 installed on its side on the mounting element 230. The HDD 220 in this example includes a connector component in its side that couples to the HDD connector 238 of the mounting element 230. As a result, the HDD 220 stands vertically up from the mounting element 230. This is the same HDD orientation shown in FIG. 9. The mounting element 230 in this example further includes a plurality of bumpers or contact surfaces 236 that support the HDD 220. It should be understood that the HDD in this example can comprise an unsealed HDD 120 or a HDD 220.

Figure 11:
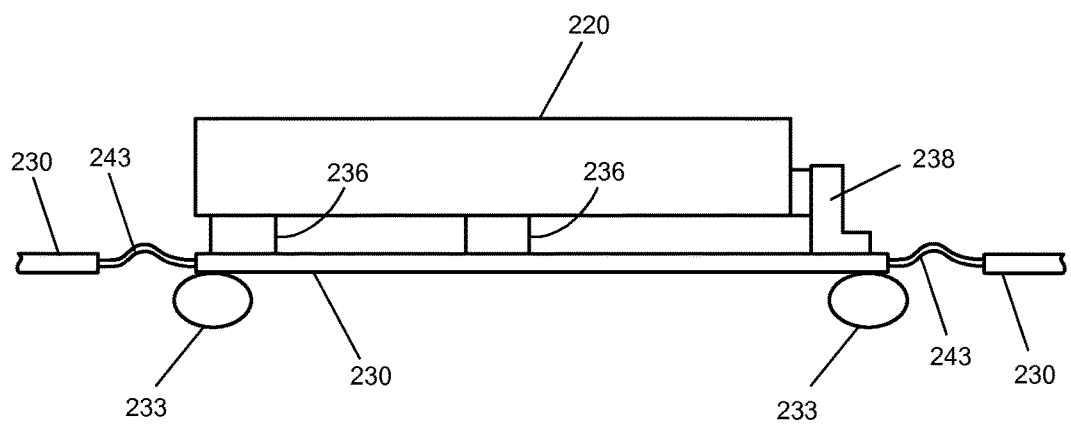
FIG. 11 shows a HDD having an end connector, but where the HDD is installed flat on the mounting element.

FIG. 11 shows a HDD 220 having an end connector, but where the HDD 220 is installed flat on the mounting element 230. The mounting element 230 in this example includes a HDD connector 238 that projects up from the mounting element 230 to engage the end connector of the HDD 220. This is the HDD orientation shown in FIG. 4. The mounting element 230 in this example further includes a plurality of bumpers or contact surfaces 236 that support the HDD 220. It should be understood that the HDD in this example can comprise an unsealed HDD 120 or a HDD 220.

Figure 12:
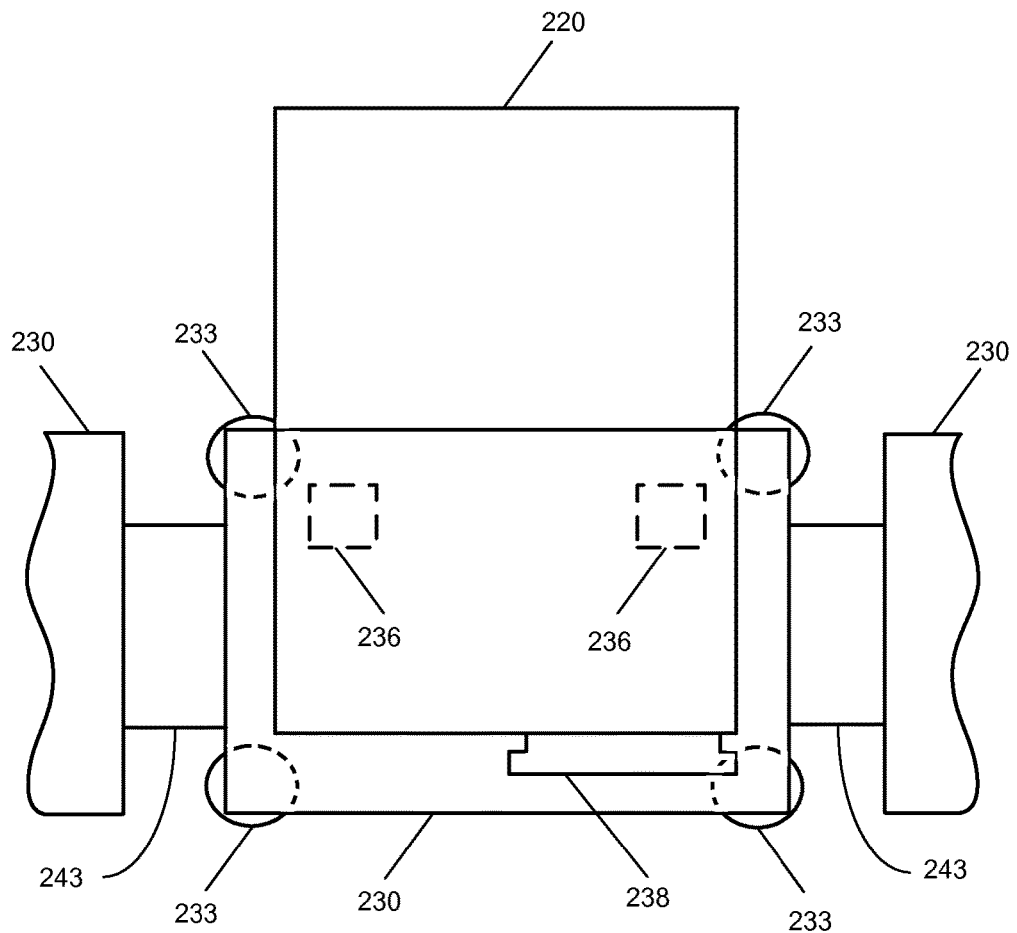
FIG. 12 shows a HDD installed flat on a mounting element, where the HDD extends out off the side of the mounting element.

FIG. 12 shows a HDD 220 installed flat on the mounting element 230, where the HDD 220 extends out off the side of the mounting element 230. The figure shows a HDD orientation similar to the HDD orientation in FIG. 11. However, in this example, the HDD 220 extends beyond the mounting element 230, with the HDD 220 being flat on the mounting element 230, but with the length or main axis of the HDD 220 being traverse to the length or main axis of the mounting element 230. The mounting element 230 in this example further includes a plurality of bumpers or contact surfaces 236 that support the HDD 220. It should be understood that the HDD in this example can comprise an unsealed HDD 120 or a HDD 220.

FIG. 13 shows the sealed storage canister 100 in another example. In this example, the unsealed HDDs 120 are oriented to lie flat on the bottom panel 112 and a formed, hollow enclosure 110 fits down over the unsealed HDDs 120. The enclosure 110 is affixed to the bottom panel 112. The enclosure 110 can be sealingly affixed to the bottom panel 112 in some examples to create the sealed storage canister 100, as previously discussed. Alternatively, as previously discussed, the enclosure structure can be sealed after assembly, such as by application of a film, paint, coating, shrink wrap, or other sealing material applied to the outside of the assembled enclosure. This is the HDD orientation shown in FIGS. 11 and 12. In yet another alternative example, electrical connections to the HDDs 120 comprise multiple individual cables or one or more fan-out cables, connecting the HDDs 120 to the external connector 160 or 260. This alternative configuration eliminates the mounting element(s) 230 and uses the pads 128 to hold the HDDs 120 relative to the enclosure 110.

Each unsealed HDD 120 in this example includes a contact layer 128 formed on portions of one or more sides of the unsealed HDDs 120. The contact layer 128 is configured to contact one or more corresponding inner surfaces of the sealed enclosure 110. In some examples, the contact layer 128 comprises an elastic layer configured to be at least partially compressed against the one or more inner surfaces of the sealed enclosure 110. The contact layer 128 cushions the unsealed HDDs 120 and absorbs shocks or vibrations. In other examples, the contact layer 128 comprises a thermally-conductive layer configured to conduct heat from the multiple unsealed HDDs 120 to the sealed enclosure 110. In yet other examples, the contact layer 128 is both elastic and thermally-conductive.

The assembly of the enclosure 110, the enclosure lid 113, and the bottom panel 112 may require a nominal compression force. As a result, the unsealed HDDs 120 will not remain loose or able to move inside the sealed enclosure 110 when the enclosure lid 113 and the bottom panel 112 are fully assembled to the enclosure 110.

Figure 14:
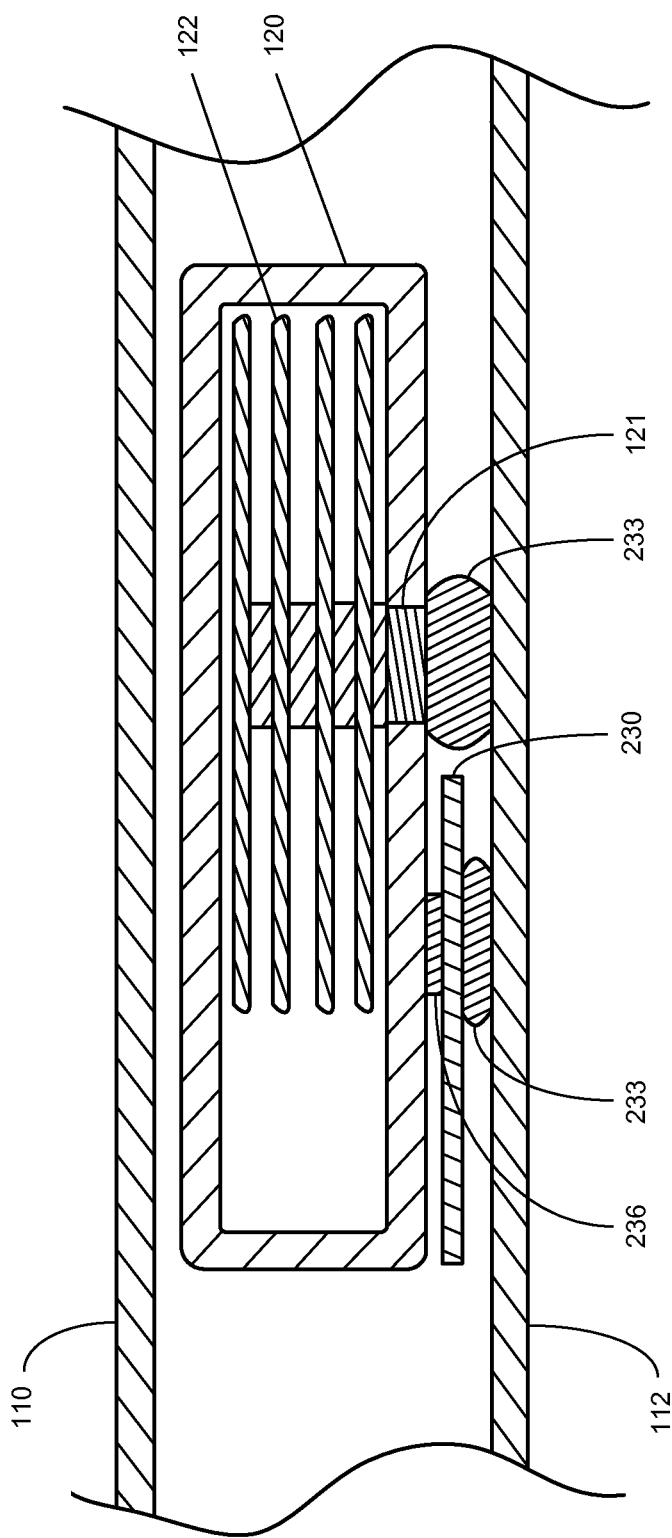
FIG. 14 shows internal detail of the sealed storage canister of FIG. 13.

FIG. 14 shows internal detail of the sealed storage canister 100 of FIG. 13. Each unsealed HDD 120 rests in a flat orientation on at least one compressible support spacer 233 and on a combination of a mounting element 230 resting on one or more compressible support spacers 233. One or more bumpers or contact surfaces 236 on the mounting element 230 support a portion of the unsealed HDD 120.

Figure 15:
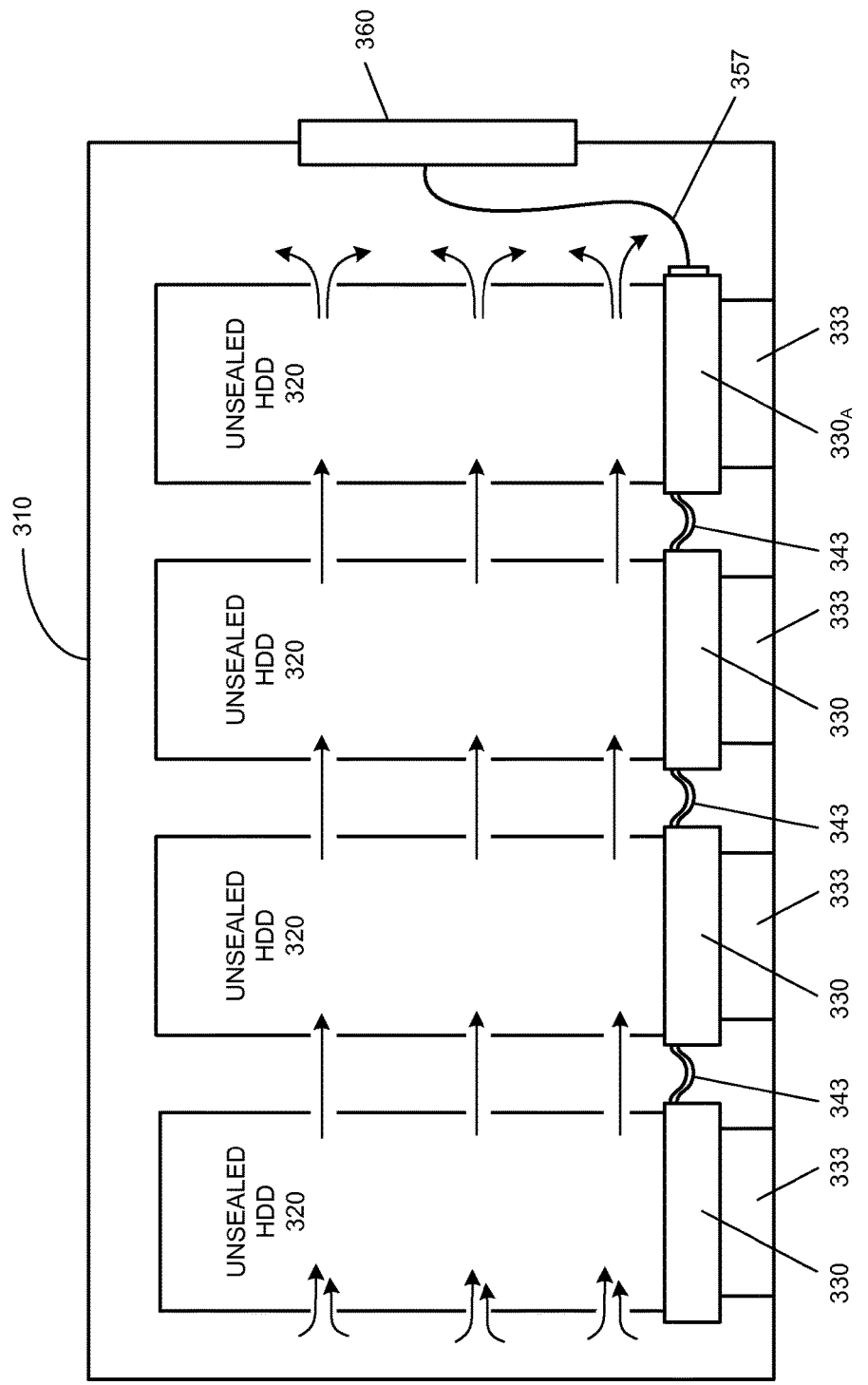
FIG. 15 shows an exemplary sealed storage canister in yet another example.

FIG. 15 shows an exemplary sealed storage canister 300 in yet another example. The sealed storage canister 300 in this example includes a sealed enclosure 310 and multiple unsealed HDDs 320 located inside the sealed enclosure 310, with the sealed storage canister 300 comprising a combination of the examples given in FIG. 1 and FIG. 5. The sealed storage canister 300 includes a sealed enclosure 310, multiple unsealed HDDs 320, and multiple mounting elements 330 and suspension elements 333, wherein each unsealed HDD 320 is received on an independent and independently cushioned mounting element 330 and suspension element 333. The sealed storage canister 300 in this example includes multiple mounting elements 330 receiving the multiple unsealed HDDs 320, an external connector 360 electrically coupled to the multiple mounting elements 330 by a cable or feed-through 357, and multiple suspension elements 333 coupled to the multiple mounting elements 330. The multiple mounting elements 330 are chained together by flexible connector elements 343 extending between adjacent mounting elements 330. A first mounting element 330A is coupled to the external connector 360 by the cabling 355. The external connector 360 is electrically coupled to all of the multiple mounting elements 330. Each mounting element 330 is supported by a corresponding suspension element 333.

The sealed enclosure 310 comprises a substantially airtight or substantially gas tight enclosure. A predetermined gas or gas mixture is contained within the sealed enclosure 310. Corrosion resistance can be improved by preventing moisture from entering the HDD. Sealing helium (or other small-molecule gas) inside a HDD reduces air resistance, reduces air turbulence and therefore reduces flow-induced vibration of internal components, and as a result reduces power consumption of a drive motor that rotates the disk or disks of the HDD.

The multiple mounting elements 330 and the multiple suspension elements 333 absorb shocks and vibrations generated by the individual HDDs 320. The multiple mounting elements 330 and the multiple suspension elements 333 do not transfer shocks or vibrations to an HDD 320 from sources outside the HDD 320. The flexible connector elements 343 ensure that any vibrations or movements in a particular HDD are not transmitted to other HDDs or other components of the storage canister 300.

While the present invention has been particularly shown and described with reference to the preferred implementations, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A sealed storage canister, comprising:
   a sealed enclosure configured to be substantially hermetically sealed for retaining a predetermined gas or gas mixture;
   multiple unsealed Hard Disk Drives (HDDs) located within the sealed enclosure, wherein the multiple unsealed HDDs are not substantially hermetically sealed and are configured to allow the predetermined gas or gas mixture to move through the multiple unsealed HDDs;
   an external connector configured to be externally accessible, wherein the external connector is directly or indirectly electrically coupled to the multiple unsealed HDDs; and
   at least one mounting element configured to receive the multiple HDDs, comprising:
      a plurality of mounting elements configured to receive the multiple unsealed HDDs, wherein each mounting element of the plurality of mounting elements is configured to receive an unsealed HDD;
      a plurality of suspension elements supporting the plurality of mounting elements, wherein each suspension element of the plurality of suspension elements supports and provides vibration isolation to a corresponding unsealed HDD of the multiple unsealed HDDs; and
      flexible connector elements extending between adjacent mounting elements of the plurality of mounting elements, wherein the flexible connector elements enable independent movement of the adjacent mounting elements.

2. The sealed storage canister of claim 1, wherein the predetermined gas or gas mixture comprises dry air, nitrogen, or helium.

3. The sealed storage canister of claim 1, wherein the predetermined gas or gas mixture is at a lower pressure than atmospheric pressure.

4. The sealed storage canister of claim 1, wherein the sealed enclosure comprises:
   an enclosure; and
   an enclosure lid sealingly affixed to the enclosure.

5. The sealed storage canister of claim 1, wherein the sealed enclosure comprises:
   an enclosure;
   an enclosure lid affixed to the enclosure; and
   a sealing layer applied to outer surfaces of the enclosure and enclosure lid.

6. The sealed storage canister of claim 1, wherein the multiple unsealed HDDs are electrically coupled to the external connector by a feed-through sealingly installed in an aperture in the enclosure.

7. The sealed storage canister of claim 1, wherein an unsealed HDD of the multiple unsealed HDDs comprises a digital storage device including one or more disk storage media.

8. The sealed storage canister of claim 1, wherein an unsealed HDD of the multiple unsealed HDDs comprises a digital storage device including at least one disk storage media and at least one solid-state storage device.

9. The sealed storage canister of claim 1, further comprising an elastic layer formed on portions of one or more sides of the multiple unsealed HDDs, wherein the elastic layer is configured to contact and be at least partially compressed against one or more inner surfaces of the sealed enclosure.

10. The sealed storage canister of claim 1, further comprising a thermally-conductive layer formed on portions of one or more sides of the multiple unsealed HDDs, wherein the thermally-conductive layer is configured to contact and be at least partially compressed against one or more inner surfaces of the sealed enclosure and configured to conduct heat from the multiple unsealed HDDs to the sealed enclosure.

11. The sealed storage canister of claim 1, wherein the sealed storage canister is configured to fit into a disk drive sled configured to receive multiple sealed storage canisters.

12. A storage sled adapted for use in a mass storage system, comprising:
- a sled tray configured to receive a plurality of sealed storage canisters;
- a sled head coupled to the sled tray and configured to provide electrical power and electrical signals to individual canisters of the plurality of sealed storage canisters; and
- at least one sealed storage canister installed in the sled tray and coupled to the sled head, wherein the at least one sealed storage canister comprises:
  - a sealed enclosure configured to be substantially hermetically sealed for retaining a predetermined gas or gas mixture;
  - multiple unsealed Hard Disk Drives (HDDs) located within the sealed enclosure, wherein the multiple unsealed HDDs are not substantially hermetically sealed and are configured to allow the predetermined gas or gas mixture to move through the multiple unsealed HDDs;
  - an external connector configured to be externally accessible, wherein the external connector is directly or indirectly electrically coupled to the multiple unsealed HDDs; and
  - at least one mounting element configured to receive the multiple unsealed HDDs, comprising:
    - a plurality of mounting elements configured to receive the multiple unsealed HDDs, wherein each mounting element of the plurality of mounting elements is configured to receive an unsealed HDD;
    - a plurality of suspension elements supporting the plurality of mounting elements, wherein each suspension element of the plurality of suspension elements supports and provides vibration isolation to a corresponding unsealed HDD of the multiple unsealed HDDs; and
    - flexible connector elements extending between adjacent mounting elements of the plurality of mounting elements, wherein the flexible connector elements enable independent movement of the adjacent mounting elements.

13. The storage sled of claim 12, wherein the predetermined gas or gas mixture comprises dry air, nitrogen, or helium.

14. The storage sled of claim 12, wherein the predetermined gas or gas mixture is at a lower pressure than atmospheric pressure.

15. The storage sled of claim 12, wherein the sealed enclosure comprises:
- an enclosure; and
- an enclosure lid sealingly affixed to the enclosure.

16. The storage sled of claim 12, wherein the sealed enclosure comprises:
- an enclosure;
- an enclosure lid affixed to the enclosure; and
- a sealing layer applied to outer surfaces of the enclosure and enclosure lid.

17. The storage sled of claim 12, wherein the multiple unsealed HDDs are electrically coupled to the external connector by a feed-through sealingly installed in an aperture in the sealed enclosure.

* * * * *